US010013632B2

(12) United States Patent
Tsuji (10) Patent No.: US 10,013,632 B2
(45) Date of Patent: Jul. 3, 2018

(54) OBJECT TRACKING APPARATUS, CONTROL METHOD THEREFOR AND STORAGE MEDIUM

(71) Applicant: CANON KABUSHIKI KAISHA, Tokyo (JP)

(72) Inventor: Ryosuke Tsuji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/967,057

(22) Filed: Dec. 11, 2015

(65) Prior Publication Data

US 2016/0189392 A1 Jun. 30, 2016

(30) Foreign Application Priority Data

Dec. 25, 2014 (JP) ................. 2014-263335

(51) Int. Cl.
*G06K 9/00* (2006.01)
*G06K 9/52* (2006.01)
(Continued)

(52) U.S. Cl.
CPC ........... *G06K 9/52* (2013.01); *G06K 9/00241* (2013.01); *G06K 9/6201* (2013.01); *G06K 9/6227* (2013.01); *G06K 9/6255* (2013.01); *G06T 7/246* (2017.01); *G06T 7/248* (2017.01); *G06T 7/44* (2017.01); *G06K 9/6203* (2013.01); *G06K 9/6212* (2013.01); *G06K 2009/3291* (2013.01); *G06T 2207/30201* (2013.01)

(58) Field of Classification Search
None
See application file for complete search history.

(56) References Cited

U.S. PATENT DOCUMENTS

2002/0198681 A1 12/2002 Kouritzin et al.
2011/0001840 A1* 1/2011 Ishii ....................... G02B 7/365
348/222.1
(Continued)

FOREIGN PATENT DOCUMENTS

CN 101051385 10/2007
CN 101212658 7/2008
(Continued)

*Primary Examiner* — Hadi Akhavannik
(74) *Attorney, Agent, or Firm* — Canon USA Inc., IP Division (57) ABSTRACT

An image capture apparatus functions as an object tracking apparatus for tracking an object included in provided images, registers a partial image indicating an object as a template, and performs template matching for estimating a region by using the template and histogram matching for registering a histogram of a partial image indicating the object and estimating a region by using the histogram. In a case where a distance between the estimation region based on the histogram matching and the estimation region based on the template matching is within a predetermined range, the estimation region based on the template matching is employed as an object region, and in a case where the distance between the estimation region based on the histogram matching and the estimation region based on the template matching is not within the predetermined range, the estimation region based on the histogram matching is employed as the object region.

9 Claims, 6 Drawing Sheets

(51) Int. Cl.
*G06K 9/62* (2006.01)
*G06T 7/246* (2017.01)
*G06T 7/44* (2017.01)
*G06K 9/32* (2006.01)

(56) References Cited

U.S. PATENT DOCUMENTS

| | | | |
|---|---|---|---|
| 2011/0150280 A1* | 6/2011 | Tsuji | G06T 7/204 |
| | | | 382/103 |
| 2013/0121535 A1* | 5/2013 | Matsukawa | G06K 9/3233 |
| | | | 382/103 |

FOREIGN PATENT DOCUMENTS

| | | |
|---|---|---|
| CN | 101369346 A | 2/2009 |
| CN | 101939980 A | 1/2011 |
| CN | 102103754 A | 6/2011 |
| JP | 2001-060269 A | 3/2001 |
| JP | 2005-318554 A | 11/2005 |

* cited by examiner

FIG.3A
OBJECT MODEL (TEMPLATE)

FIG.3B
SEARCH IMAGE

FIG.4A
OBJECT MODEL

FIG.4B
SEARCH IMAGE

OBJECT TRACKING APPARATUS, CONTROL METHOD THEREFOR AND STORAGE MEDIUM

BACKGROUND

Field of the Disclosure

The present disclosure relates to an object tracking apparatus tracking an object included in images provided successively, a control method therefor, an image capture apparatus, a display apparatus, and a storage medium.

Description of the Related Art

A technique for extracting a particular object from images provided successively in a chronological order and tracking the extracted object is extremely useful, and is, for example, used for identifying the face region of a person and a person's body region in a motion picture. Such technique can be used in many fields, for example, a teleconference, a man machine interface, security, a monitor system for tracking any object, and image compression.

In digital still cameras and digital video cameras, Japanese Patent Application Laid-Open No. 2005-318554 and Japanese Patent Application Laid-Open No. 2001-60269 suggest a technique for extracting and tracking any object included in a captured image designated by using a touch panel or the like and optimizing a focus state and an exposure state for the object. For example, Japanese Patent Application Laid-Open No. 2005-318554 discusses an image capture apparatus for detecting (extracting) and tracking a position of a face included in a captured image and focusing and capturing an image of the face at an optimum exposure level. Japanese Patent Application Laid-Open No. 2001-60269 discusses a technique for automatically tracking a particular object by template matching. The template matching is a method for registering, as a template image, a partial image obtained by clipping an image region including a particular object to be tracked, and estimating, in the image, a region of which similarity to the template image is the highest or of which difference from the template image is lowest, so that the particular object is tracked. In the template matching, any given region included in the image is designated by using an input interface, such as a touch panel, and the template image is registered based on such region.

In the template matching, image data are used as an evaluation standard. In a case where there is a great change in appearance of the object, such as a change in the posture, between the template image and an image to be searched, there is an issue in which a correct region cannot be estimated.

For this issue, there is a method for using a histogram instead of image data itself as the evaluation standard of matching (histogram matching). By converting information indicating the object from the image data into the histogram, ambiguity is given, and an object tracking robust against the change in the posture of the object can be realized. On the other hand, when the histogram matching based on the histogram is compared with the template matching based on the image data, there is an aspect that the estimated accuracy of the position is inferior in a case where the change of appearance of the object is small.

SUMMARY

According to an aspect of the present invention, an object tracking apparatus for tracking an object included in images provided successively includes a first registering unit configured to register a partial image indicating an object in a predetermined image among the provided images as a template, a first matching unit configured to estimate a first object region by matching another image of the provided images with the template registered by the first registering unit, a second registering unit configured register a histogram generated based on a pixel value of the partial image indicating the object in the predetermined image among the provided images, a second matching unit configured to estimate a second object region by matching a histogram of a partial region of the another image with the histogram registered by the second registering unit, and an object region determination unit configured to determine, based on estimation results of the first matching unit and the second matching unit, an estimated object region by employing the estimation result of either one of the first matching unit and the second matching unit, wherein in a case where a distance between the second object region and the first object region is within a predetermined range, the object region determination unit determines the first object region as the estimated object region, and wherein in a case where the distance between the second object region and the first object region is not within the predetermined range, the object region determination unit determines the second object region as the estimated object region.

Further features of the present invention will become apparent from the following description of exemplary embodiments with reference to the attached drawings.

DESCRIPTION OF THE EMBODIMENTS

Hereinafter, an exemplary embodiment of the present invention will be described with reference to appended drawings.

Figure 1:
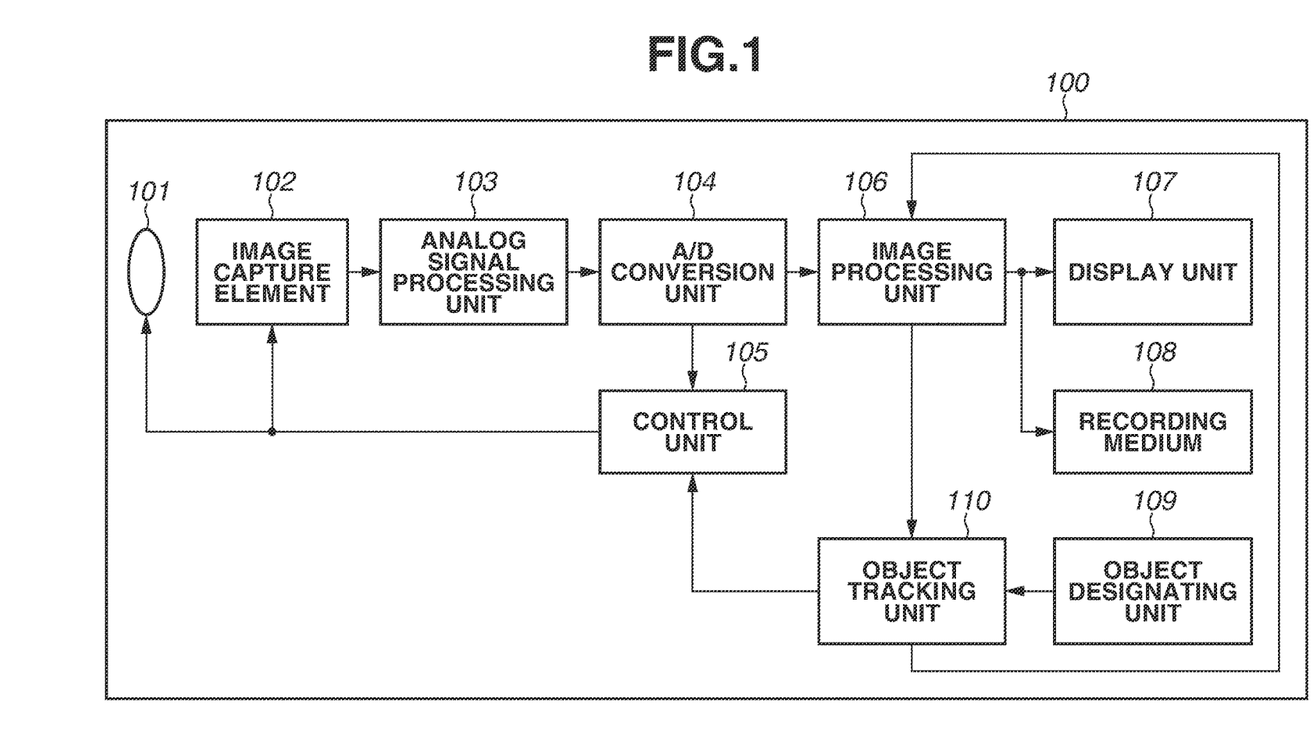
FIG. 1 is a block diagram illustrating schematic configuration of an image capture apparatus according to an exemplary embodiment.

FIG. 1 is a block diagram illustrating a schematic configuration of an image capture apparatus 100 according to the exemplary embodiment. In the present exemplary embodiment, the image capture apparatus 100 is embodied as a digital camera for capturing an image of an object. The image capture apparatus 100 also functions as an object tracking apparatus for tracking an object included in images provided successively in a chronological order.

The image capture apparatus 100 includes an image capture optical system 101, an image capture element 102, an analog signal processing unit 103, an A/D conversion unit 104, a control unit 105, an image processing unit 106, a display unit 107, a recording medium 108, an object designating unit 109, and an object tracking unit 110.

Light representing an image of an object is condensed by the image capture optical system 101, and is incident upon the image capture element 102 constituting by a chargecoupled device (CCD) image sensor and a complementary metal-oxide semiconductor (CMOS) image sensor. The image capture element 102 outputs an electric signal according to the intensity of the incident light in units of pixels (More specifically, the image capture element 102 photoelectrically converts the image of the object formed by the image capture optical system 101.). The electric signal which is output from the image capture element 102 is an image signal representing the image of the object captured by the image capture element 102.

The video signal which is output from the image capture element 102 is subjected to analog signal processing, such as correlated double sampling (CDS), by the analog signal processing unit 103. The video signal which is output from the analog signal processing unit 103 is converted into a format of digital data by the A/D conversion unit 104, and is input into the control unit 105 and the image processing unit 106.

The control unit 105 is constituted by a central processing unit (CPU) and a micro controller, and is configured to centrally control the operation of the image capture apparatus 100. The control unit 105 controls image capture conditions, such as a focus situation and an exposure situation, with which the image capture element 102 captures an image. More specifically, the control unit 105 controls the focus control mechanism and the exposure control mechanism (both of which are not illustrated) of the image capture optical system 101 based on the video signal which is output from the A/D conversion unit 104. For example, the focus control mechanism is an actuator and the like for driving the lenses included in the image capture optical system 101 in an optical axis direction, and the exposure control mechanism is an actuator and the like for driving the diaphragm and the shutter. In addition, the control unit 105 performs reading control of the image capture element 102, for example, the output timing and the output pixel of the image capture element 102. The control unit 105 controls each unit of the image capture apparatus 100 by developing program codes stored in the read-only memory (ROM) to the work region of the random access memory (RAM) and executing the program codes in order.

The image processing unit 106 performs image processing, such as gamma correction and white balance processing, on the video signal which is output from the A/D conversion unit 104. In addition, the image processing unit 106 also has a function of not only performing normal image processing but also performing image processing using information about an object region in the image provided from the object tracking unit 110 described below.

The video signal that is output from the image processing unit 106 is sent to the display unit 107. The display unit 107 is constituted by, for example, a liquid crystal display (LCD) and an organic electroluminescent (EL) display, and displays the video signal. The images captured successively in a chronological order by the image capture element 102 are successively displayed on the display unit 107, so that the display unit 107 can be functioned as an electronic viewfinder (EVF). The display unit 107 displays, in a rectangle shape or the like, the object region including the object tracked by the object tracking unit 110.

The video signal that is output from the image processing unit 106 is recorded to the recording medium 108 (for example, a detachable memory card). The recording destination of the video signal may be an internal memory card of the image capture apparatus 100 or may be an external apparatus connected in such a manner that the image capture apparatus 100 can communicate by communication interface (both of which are not illustrated).

The object designating unit 109 is constituted by an input interface including, for example, a touch panel and a button. The user (a person who captures an image) can designate any object included in the image as a tracking target with the object designating unit 109.

The object tracking unit 110 tracks the object included in the images (image signal) provided successively in a chronological order (i.e., the images captured at different points in time) from the image processing unit 106. The object tracking unit 110 tracks the object designated by the object designating unit 109 based on the pixel pattern and the histogram of the object. Alternatively, the object tracking unit 110 may be configured to include a particular object detection unit (not illustrated), for example, for face detection, to track the detected object. The details of the object tracking unit 110 will be described below.

The control unit 105 can use information about the object region provided from the object tracking unit 110 to control the focus control mechanism and the exposure control mechanism described above. More specifically, focus control using a contrast value in the object region and exposure control using a luminance value in the object region are performed. Therefore, the image capture apparatus 100 can perform image capture processing in view of a particular object region in the captured image.

The details of the object tracking unit 110 will be described. The object tracking unit 110 functions as two types of matching units. One is a matching unit for adopting a partial image indicating a target object as a template and collating a partial region of the provided image, and changing the collated partial region, thus estimating a region of which similarity is high or of which difference is low (hereinafter referred to as template matching). Another is a matching unit for using the histogram of a partial image indicating a target object and collating the histogram of a partial region of the provided image, and changing the collated partial region, thus estimating a region of which similarity is high or of which difference is low (hereinafter referred to as histogram matching). The object region is determined based on each matching evaluation value.

Figure 2:
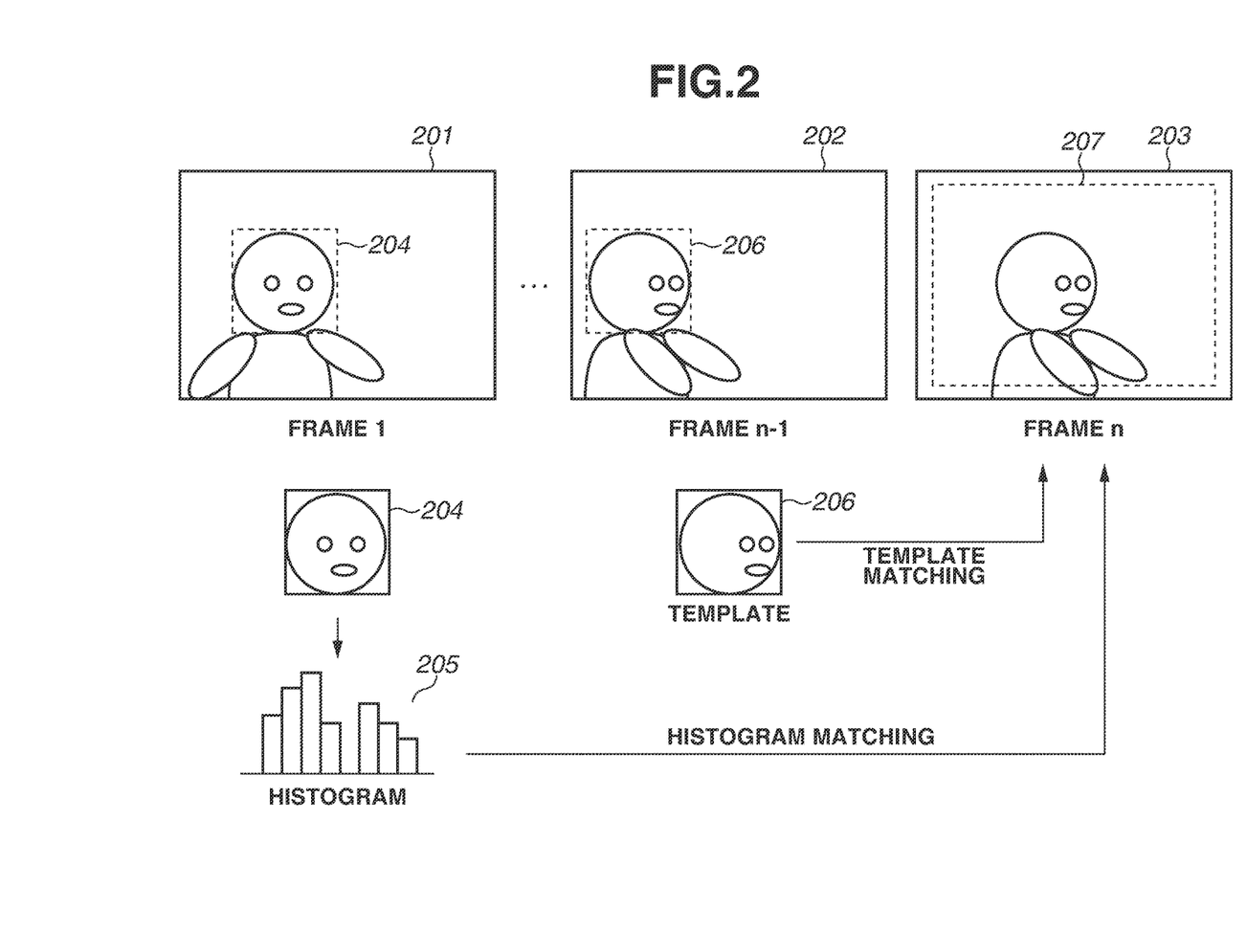
FIG. 2 is a diagram illustrating a frame work of object tracking.

FIG. 2 illustrates a frame work of object tracking performed by the object tracking unit 110.

Images 201, 202, and 203 are examples of input images of the object tracking unit 110. The image 201 is an image in which a tracking target is designated by the object designating unit 109, and is a start image of object tracking processing. The image 202 is one of the images that are subjected to the object tracking processing and is an image captured at a point closest to the current time. The image 203 is the image of the current time, and is the image on which processing for estimating the object region is performed.

A partial image 204 indicates the object which is to be tracked in the start image 201 of tracking histogram 205 is generated from the partial image 204, and the histogram 205 is registered.

A partial image 206 indicates a result immediately before the object tracking processing, and the partial image 206 is registered as a template.

A search range 207 indicates a search range of the object tracking processing. Histogram matching using the histogram 205 and template matching using the template 206 are executed on the search range 207. More specifically, the histogram matching based on the start frame (frame 1) of the tracking and the template matching based on the frame (frame n−1) immediately before the tracking.

The details of the template matching will be described with reference to FIGS. 3A and 3B.

Figure 3A:
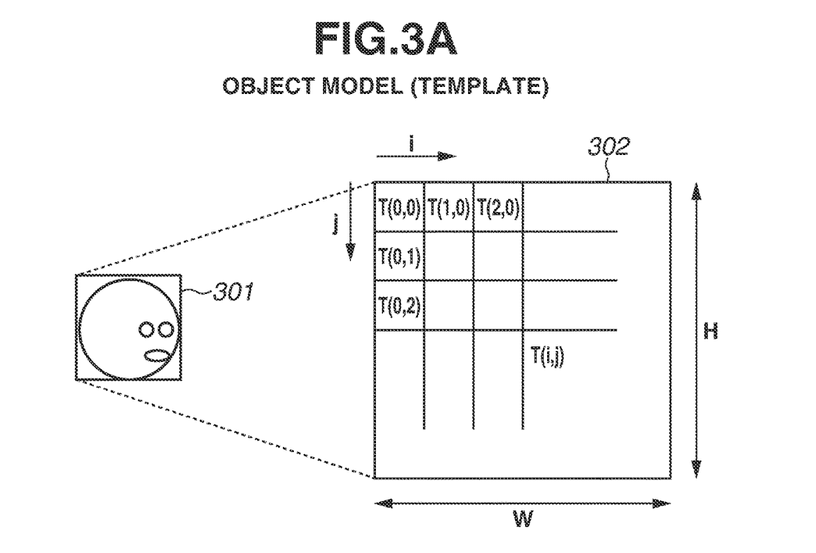
FIGS. 3A and 3B are diagrams for describing template matching.

FIG. 3A illustrates an example of an object model (template) in the template matching. A partial image (template) 301 indicates an object to be tracked, and a pixel pattern of the partial image 301 is treated as a feature amount. A feature amount 302 represents a feature amount of the template 301, and a luminance signal of pixel data is adopted as the feature amount. The feature amount T(i, j) is expressed by the following expression (1):

$$T(i,j)=\{T(0,0),T(1,0),\ldots,T(W-1,H-1)\} \quad (1)$$

where the coordinates in the template region are (i, j), the number of horizontal pixels is W, and the number of vertical pixels is H.

Figure 3B:
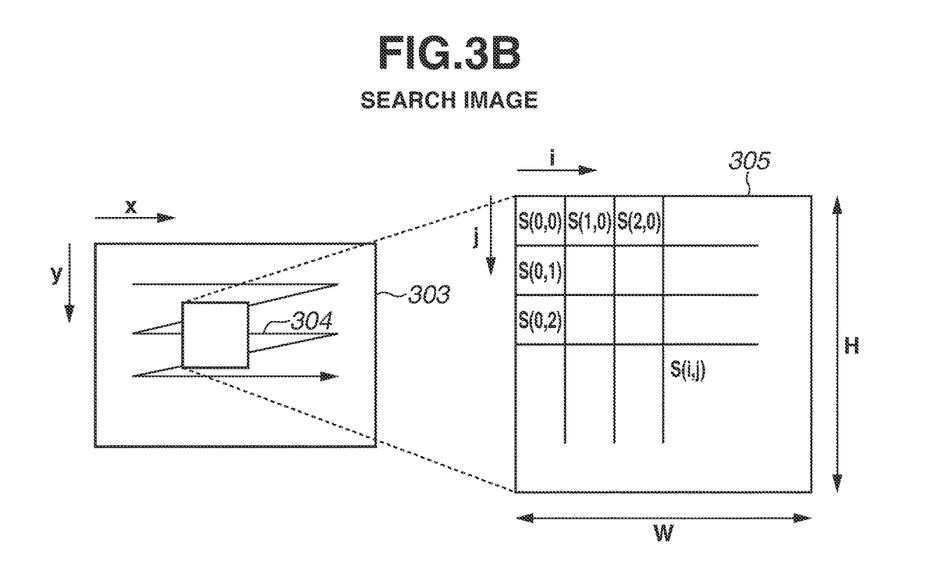

FIG. 3B illustrates information about an image in which the tracking target is searched. A search range 303 is a range where the matching processing is performed. The coordinates in the search image is expressed by (x, y). A partial region 304 is a region from which an evaluation value of matching is obtained. A feature amount 305 represents a feature amount of the partial region 304, and like the template 301, and the luminance signal of the pixel data is adopted as the feature amount. The feature amount S(i, j) is expressed by the following expression (2):

$$S(i,j)=\{S(0,0),S(1,0),\ldots,S(W-1,H-1)\} \quad (2),$$

where the coordinates in the partial region is (i, j), the number of horizontal pixels is W, and the number of vertical pixels is H.

A sum of absolute difference (SAD) value is used as a calculation method for evaluating the similarity between the template 301 and the partial region 304. The SAD value is calculated by the following expression (3):

$$V(x,y)=\Sigma_{y=0}^{M-1}\Sigma_{x=0}^{W-1}|T(i,j)-S(i,j)| \quad (3).$$

The SAD value V(x, y) is calculated in such a manner that the partial region 304 is shifted pixel by pixel from the upper left corner of the search range 303 in order. Coordinates (x, y) of which calculated V(x, y) indicates the minimum value is the position most similar to the template 301. More specifically, the position indicating the minimum value is a position where a tracking target sought for in the search image is likely to exist.

According to the present exemplary embodiment, one-dimensional information about the luminance signal is used as the feature amount. Alternatively, three-dimensional information about, for example, signals of luminance, hue, and saturation may be used as the feature amount. According to the present exemplary embodiment, the SAD value has been described as the calculation method of the evaluation value of the matching. Alternatively, a different calculation method, such as normalized correlation coefficient (NCC) may be used.

The details of the histogram matching will be described with reference to FIGS. 4A and 4B.

Figure 4A:
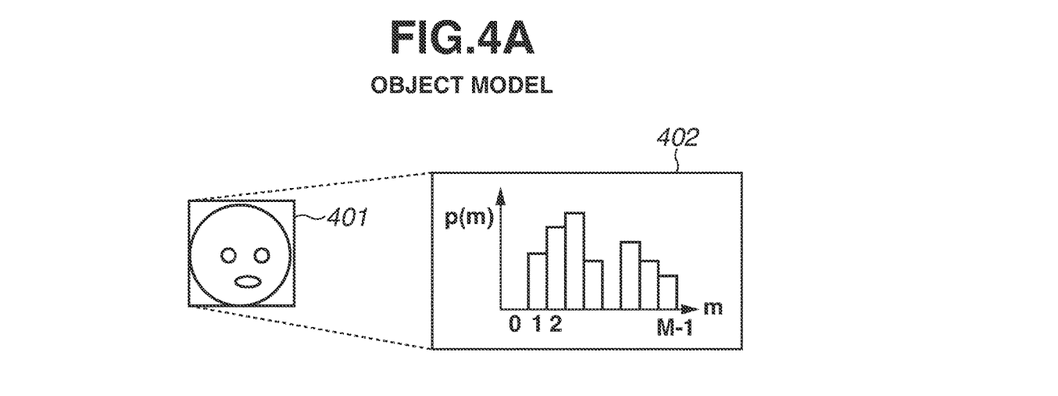
FIGS. 4A and 4B are diagrams for describing histogram matching.

FIG. 4A illustrates an example of an object model in the histogram matching. A partial image 401 indicates an example of the object to be tracked, and a histogram generated from pixel data of the partial image 401 is treated as the feature amount. A feature amount 402 represents the feature amount of the partial image 401, and the feature amount is expressed by the following expression (4):

$$p(m)=\{p(0),p(1),\ldots p(M-1)\} \quad (4),$$

where the feature amount is a histogram of M level luminance signal.

Figure 4B:
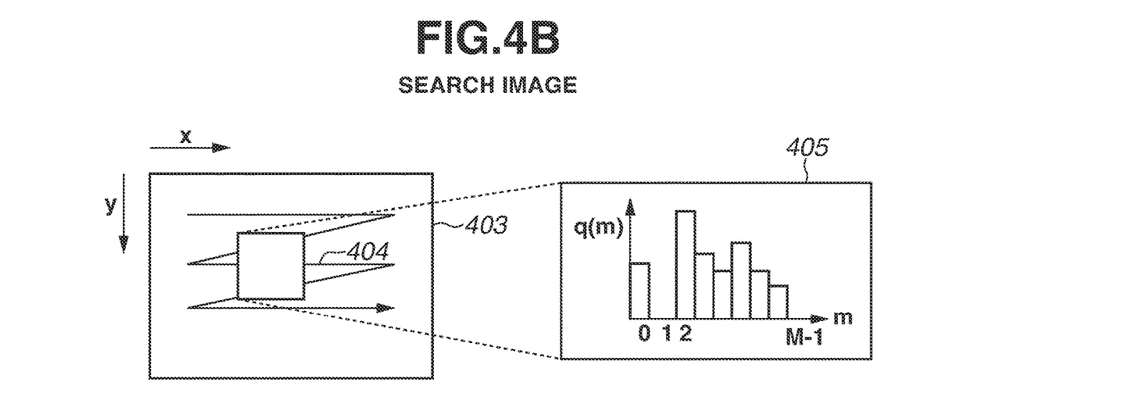

FIG. 4B illustrates information about an image were a tracking target is searched. A search range 403 is a range where the matching processing is performed. The coordinates in the search image are represented by (x, y). A partial region 404 is a region from which an evaluation value of matching is obtained. A feature amount 405 expresses a feature amount generated from the partial region 404, and the feature amount is expressed by the following expression (5):

$$q(m)=\{(q(0),q(1),\ldots q(M-1)\} \quad (5),$$

where the feature amount is a histogram of M level luminance signal, like in the partial image 401.

Bhattacharyya coefficient is used as a calculation method for evaluating the similarity between the histogram of the partial image 301 and the histogram of the partial region 404. The Bhattacharyya coefficient is obtained by the following expression (6):

$$D(x,y)=\Sigma_{m=0}^{M-1}\sqrt{p(m)\times q(m)} \quad (6).$$

The Bhattacharyya coefficient D(x, y) is calculated in such a manner that the partial region 404 is shifted pixel by pixel from the upper left corner of the search range 403 in order. Coordinates (x, y) of which calculated D(x, y) indicates the maximum value is the position most similar to the partial image 401. More specifically, the position indicating the maximum value is a position where a tracking target sought for in the search image is likely to exist.

According to the present exemplary embodiment, one-dimensional information about the luminance signal is used as the feature amount. Alternatively, three-dimensional information about, for example, signals of luminance, hue, and saturation may be used as the feature amount. According to the present exemplary embodiment, the Bhattacharyya coefficient has been described as the calculation method of the evaluation value of the matching. Alternatively, a different calculation method, such as histogram intersection, may be used.

The image capture apparatus 100 according to the present exemplary embodiment determines the object region from the evaluation value and the estimation region (estimation position) based on the template matching and the histogram matching.

As can be understood from the expression described above, the histogram matching provides more ambiguity to the feature amount than the template matching. In the template matching, whether the pattern of pixel value of luminance signal is similar is adopted as the evaluation standard. However, in the histogram matching, whether the ratio of pixel value of luminance signal is similar is adopted as the evaluation standard. Therefore, in a case where the posture of the object greatly changes in the state of the object between the object model and the search image, the chance of success in the estimation is higher in the histogram matching. On the other hand, by giving ambiguity to the feature amount, the histogram matching has a lower degree of accuracy in the estimation of the position than the template matching. In the estimation of the object region, the histogram matching has a higher performance in rough estimation of the object region than the template matching, but this means that the histogram matching has a lower performance in detailed position adjustment than the template matching.

As compared with the histogram matching, in a case where a change of appearance, for example, a change in the posture of the object, greatly changes, the template matching has difficulty in estimating the correct object region. On the other hand, in a case where the change of appearance of the object is small, the template matching has a higher level of accuracy in the estimation of the position (the performance in the position adjustment is higher).

In view of the characteristics described above, the object tracking unit 110 is configured to perform the histogram matching for registering an object model from the start frame of tracking and to perform the template matching for registering an object model from a frame immediately before the tracking. In the histogram matching, an object model based on information of the object designating unit 109 is registered, and in the template matching, an object model based on a result of the object tracking unit 110 is successively updated. Therefore, from the view point of whether the object model correctly includes a target object, the histogram matching in which successive update is not performed is better. The template matching may include an estimation error of the object tracking unit 110 and effects of the estimation error, and may include information other than the target object, for example, the background in the object model. Reliability determination of matching is performed based on the evaluation value or each matching function, but the accuracy of the reliability determination is attributed to the reliability of the object model. More specifically, in the histogram matching, the accuracy of the reliability determination is high, but the accuracy of the reliability determination of the template matching is low.

The above described case is only an example, and depending on the degree of the change in the posture of the object and the change of the appearance, the histogram of the object region may change. Therefore, the object model may also be registered from a frame immediately before the tracking even in the histogram matching. However, in order to prevent the background from being included in the object model, it is desirable to update the object model of the histogram matching only when the object tracking based on the template matching of which estimation accuracy of the position is high is successfully performed. Alternatively, in any of the histogram matching and the template matching, it may be possible to register the object models from both of the start frame of tracking and the frame immediately before the tracking and use the object models obtained from both of the frames.

A method for determining the object region from each of the matching evaluation values by utilizing the characteristics described above will be described. In a case where there is an estimation region based on the template matching in proximity to an estimation region based on the histogram matching, the estimation region based on the template matching is employed as the object region. In a case where there is not any estimation region based on the template matching in proximity to the estimation region based on the histogram matching, the estimation region based on the histogram matching is employed as the object region. The processing for determining which of the matching methods is employed to obtain the estimation region is limitedly performed for a case where the reliability of the histogram matching is high, so that it is possible to cope with a case where the search of the histogram matching fails or the object sought for disappears from the image in the search range.

Figure 5:
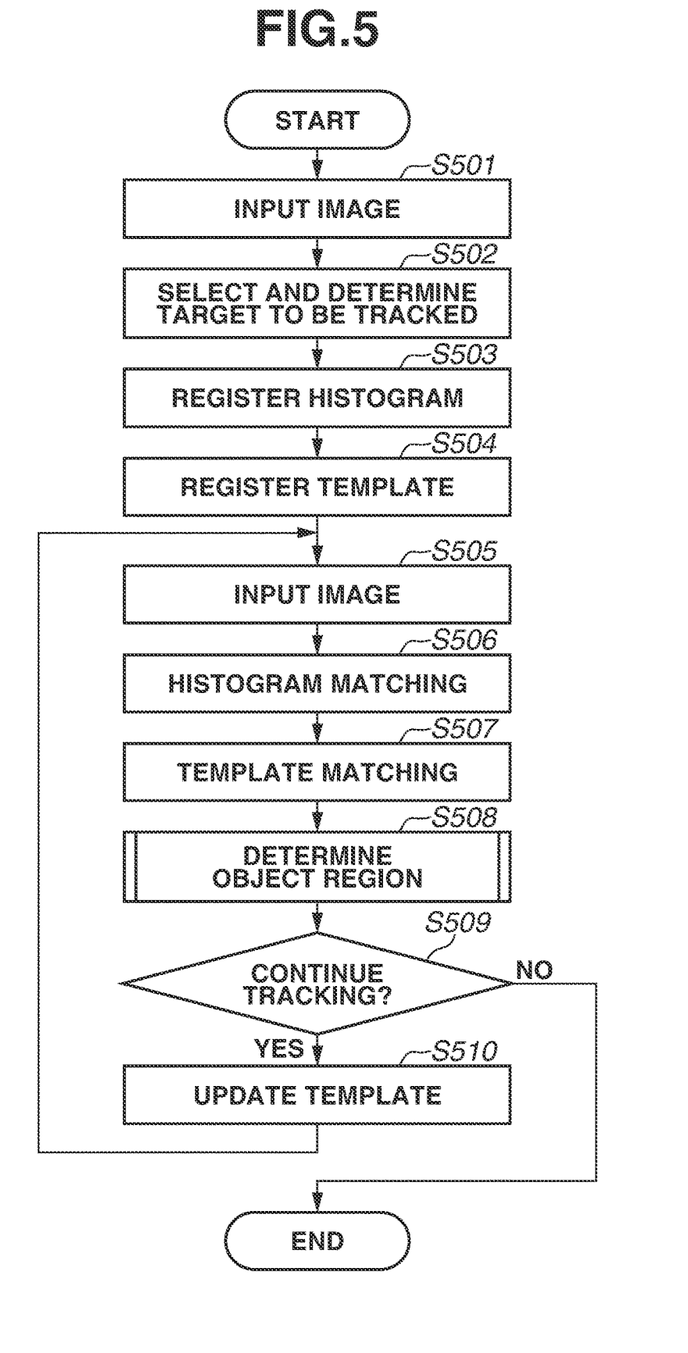
FIG. 5 is a flowchart illustrating a flow of object tracking processing according to the exemplary embodiment.

FIG. 5 is a flowchart illustrating object tracking processing according to the present exemplary embodiment.

In step S501, an image is input, from the image processing unit 106 to the object tracking unit 110. In step S502, the object tracking unit 110 determines a partial image indicating the object to be tracked, based on the input image and the information from the object designating unit 109.

In step S503, the object tracking unit 110 registers a histogram which is the object model of the histogram matching, based on the partial image indicating the object to be tracked. In step S504, the object tracking unit 110 registers the partial image indicating the object to be tracked as a template which is the object model of the template matching.

In step S505, an image is input from the image processing unit 106 to the object tracking unit 110. The input image of step S505 indicates a search image of the object tracking unit 110, and the input image of step S501 and the input image of step S505 are images each captured at a different point of time. Based on the input image of step S505, in step S506, the histogram matching is performed. Then, in step S507, the template matching is performed.

In step S508, the object tracking unit 110 determines an object region based on the evaluation values of the histogram matching and the template matching and the region information thereabout.

Figure 6:
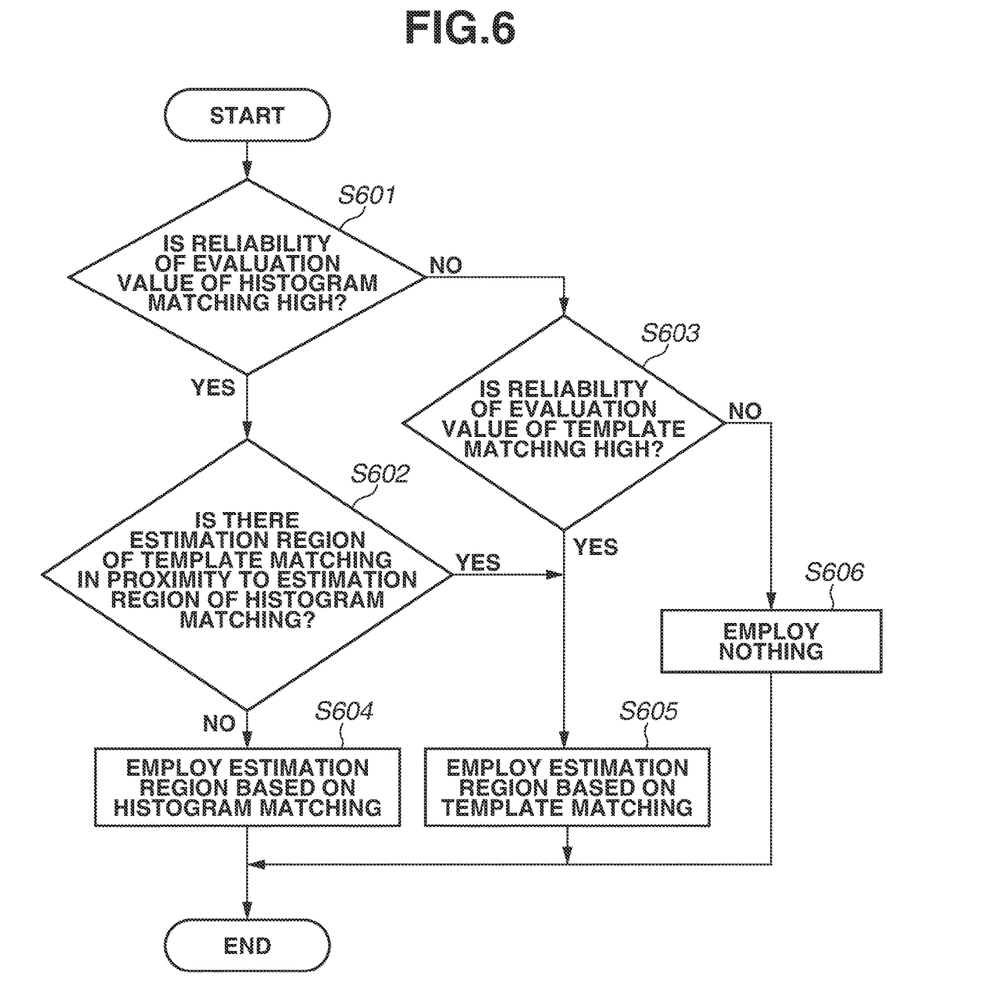
FIG. 6 is a flowchart illustrating a flow of the object region determination processing of FIG. 5.

A flow of the object region determination processing of step S508 will be described with reference to FIG. 6.

In step S601, the object tracking unit 110 determines whether the reliability of the evaluation value of the histogram matching is high. For example, in the reliability determination, in a case where the maximum value of the Bhattacharyya coefficient D(x, y) of the expression (6) is equal to or more than a predetermined threshold value, the reliability is determined to be high, and in a case where the maximum value of the Bhattacharyya coefficient D(x, y) is less than a predetermined threshold value, the reliability is determined to be low.

In a case where the reliability of the evaluation value of the histogram matching is high (YES in step S601), the processing proceeds to step S602. In step S602, a determination of whether there is any estimation region based on the template matching in proximity to an estimation region of the histogram matching is performed. For example, in the determination, a distance between the coordinates (x, y) of the maximum value of the Bhattacharyya coefficient D(x, y) of the expression (6) and the coordinates (x, y) of the minimum value of the SAD value V(x, y) of the expression (3) is calculated, and a determination is performed based on whether the calculated distance is within a predetermined range.

In a case where there is not any estimation region based on the template matching in proximity to an estimation region based on the histogram matching (NO in step S602), the processing proceeds to step S604. Then, in step S604, the estimation region based on the histogram matching is employed. More specifically, the coordinates (x, y) of the maximum value of the Bhattacharyya coefficient D(x, y) obtained by the expression (6) is determined as the object position. In contrast, in a case where there is an estimation region based on the template matching in proximity to an estimation region of the histogram matching (YES in step S602) the processing proceeds to step S605. Then, in step S605, the estimation region based on the template matching is employed. More specifically, the coordinates (x, y) of the minimum value of the SAD value V(x, y) obtained, by the expression (3) is determined as the object position.

On the other hand, in a case where the reliability of the evaluation value of the histogram matching is low (NO in step S601), the processing proceeds to step S603. In step S603, a determination of whether the reliability of the evaluation value of the template matching is high is performed. For example, in reliability determination, in a case where the minimum value of the SAD value V(x, y) obtained by the expression (3) is less than a predetermined threshold value, the reliability is determined to be high, and in a case where the minimum value of the SAD value V(x, y) is equal to or more than the predetermined threshold value, the reliability is determined to be low.

In a case where the reliability of the evaluation value of the template matching is high (YES in step S603), the processing proceeds to step S605. Then, in step S605, the estimation region based on the template matching is employed. In contrast, in a case where the reliability of the evaluation value of the template matching is low NO in step S603), the processing proceeds to step S606. Then, in step S606, both of the estimation regions based on the template matching and the histogram matching are not employed.

As described above, in a case where the reliability based on the reliability determination of the histogram matching is high, without relying on the reliability based on the reliability determination of the template matching, a determination of whether to employ the estimation region based on the template matching or the estimation region based on the histogram matching is performed.

Back to the description of FIG. 5, when the object region is determined in step S508, in step S509, the object tracking unit 110 determines whether to continue the tracking based on the result. For example, in the determination, in a case where both of the estimation regions of the template matching and the histogram matching are not employed, the tracking is determined not to be continued, like the process in step S606. On the other hand, in a case where any one of the estimation regions of the template matching and the histogram matching is employed like the process in step S604 and step S605, the tracking is continued. In a case where the tracking is determined not to be continued (NO in step S509), the object tracking processing is terminated. This procedure is expected to be executed in a case where the object to be tracked no longer exists in the image in the search range. In a case where the tracking is determined to be continued (YES in step S509), the processing is proceed to step S510. In step S510, the template is updated based on the estimated object region. Then, the processing returns to step S505, and the repetition process is executed based on the images successively provided.

As described above, both of the histogram matching and the template matching are used, and the object region can be accurately estimated in view of the characteristics of each of the matching methods, so that the performance in the object tracking can be improved.

The present invention has been described with the exemplary embodiment, but the above exemplary embodiment is nothing but describing an example of exemplary embodiment for implementing the present invention, and it should be understood that the technical scope of the present invention is not interpreted in a limited manner. More specifically, the present invention can be implemented in various manners without deviating from the technical concept or the main features thereof.

In the exemplary embodiment described above, a case where the object tracking apparatus is applied to the image capture apparatus has been described as an example, but the device to which the object tracking apparatus is applied is not limited to the image capture apparatus. For example, the object tracking apparatus can be applied to a display apparatus for displaying images (reproduction data) provided from an external device or a recording medium. The display apparatus performs the object tracking processing by adopting the reproduction data as the data of the object tracking processing. A control unit, such as a micro controller, in this display apparatus controls the display condition for displaying the image based on information about the object extracted by the object tracking processing (the position and the size of the object in the image). More specifically, the control unit controls display of information indicating the object, such as a frame, at the position of the object in the image in a superimposed manner, and the luminance, the tone, and the like of the display image according to the luminance and color information about the object portion.

The present invention can also be achieved by processing in which a program for achieving one or more functions of the above exemplary embodiment is provided to a system or an apparatus via a network or a storage medium, and one or more processors in a computer of the system or the apparatus reads and executes the program. The present invention can also be achieved by a circuit (for example, application specific integrated circuit (ASIC)) for achieving one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-263335, filed Dec. 25, 2014, which is hereby incorporated by reference herein in its entirety.

What is claimed is:

1. An object tracking apparatus for tracking an object included in images provided successively, the object tracking apparatus comprising:
   at least one non-transitory memory device;
   at least one processor;
   a first registering unit configured to register a template generated based on a partial image indicating an object in a predetermined image among the provided images;
   a first matching unit configured to estimate coordinates of a first object region by performing template matching in which the registered template is compared to another image of the provided images;
   a second registering unit configured to register a histogram generated based on pixel values of the partial image indicating the object in the predetermined image;
   a second matching unit configured to estimate coordinates of a second object region by performing histogram matching in which the registered histogram is compared to a histogram of a partial region of the another image;
   an object region determination unit configured to determine, based on estimation results of the first matching unit and the second matching unit, an estimated object region by employing the estimation results of both the template matching and the histogram matching,
   wherein, in a case where a distance between the coordinates of the second object region and the coordinates of the first object region is within a predetermined range, the object region determination unit determines the first object region as the estimated object region using the template matching,
   wherein, in a case where the distance between the coordinates of the second object region and the coordinates of the first object region is not within the predetermined range, the object region determination unit determines the second object region as the estimated object region using the histogram matching, and wherein the first registering unit, the first matching unit, a second registering unit, a second matching unit, and the object region determination unit are implemented by the at least one processor executing at least one program recorded on the at least one non-transitory memory device.

2. The object tracking apparatus according to claim 1, wherein the first registering unit updates the template based on an image provided in a frame immediately before tracking performed by the object tracking apparatus, and
wherein the second registering unit registers the histogram based on an image provided by a start frame of the tracking performed by the object tracking apparatus.

3. The object tracking apparatus according to claim 1 wherein in a case where reliability of the second object region is more than a predetermined value, the object region determination unit determines the estimated object region using both of the estimation results of the first matching unit and the second matching unit.

4. The object tracking apparatus according to claim 1 wherein in a case where both of the reliability of the first object region and reliability of the second object region are less than a predetermined value, the object region determination unit terminates tracking of the object.

5. The object tracking apparatus according to claim 1, wherein the first registering unit registers the template based on a luminance value of the partial image.

6. An image capture apparatus comprising:
the object tracking apparatus according to claim 1;
an image capture element configured to successively provide captured images to the object tracking apparatus; and
a CPU configured to control the image capture element according to information, about the object, which is output by the object tracking apparatus.

7. An object tracking method for tracking an object included in images provided successively, the object tracking method comprising:
registering, as first registering, template generated based on a partial image indicating an object in a predetermined image among the provided images;
matching, as first matching, for estimating coordinates of a first object region by performing template matching in which the registered template is compared to another image of the provided images;
registering, as second registering, a histogram generated based on pixel values of the partial image indicating the object in the predetermined image;
matching, as second matching, for estimating coordinates of a second object region by performing histogram matching in which the registered histogram is compared to a histogram of a partial region of the another image; and
determining, as object region determining, based on estimation results of the first matching and the second matching, an estimated object region by employing the estimation results of both the template matching and the histogram matching,
wherein, in a case where a distance between the coordinates of the second object region and the coordinates of the first object region is within a predetermined range, the object region determining determines the first object region as the estimated object region using the template matching, and
wherein, in a case where the distance between the coordinates of the second object region and the coordinates of the first object region is not within the predetermined range, the object region determining determines the second object region as the estimated object region using the histogram matching.

8. A non-transitory computer-readable medium storing a program causing a computer to execute the object tracking method, the object tracking method comprising:
registering, as first registering, a template generated based on a partial image indicating an object in a predetermined image among the provided images;
matching, as first matching, for estimating coordinates of a first object region by performing template matching in which the registered template is compared to another image of the provided images;
registering, as second registering, a histogram generated based on pixel values of the partial image indicating the object in the predetermined image;
matching, as second matching, for estimating coordinates of a second object region by performing histogram matching in which the registered histogram is compared to a histogram of a partial region of the another image; and
determining, as object region determining, based on estimation results of the first matching and the second matching, an estimated object region by employing the estimation results of both the template matching and the histogram matching,
wherein, in a case where a distance between the coordinates of the second object region and the coordinates of the first object region is within a predetermined range, the object region determining determines the first object region as the estimated object region using the template matching, and
wherein, in a case where the distance between the coordinates of the second object region and the coordinates of the first object region is not within the predetermined range, the object region determining determines the second object region as the estimated object region using the histogram matching.

9. An object tracking apparatus for tracking an object included in a plurality of images, the object tracking apparatus comprising:
at least one processor; and
at least one non-transitory memory device storing at least one program which when executed by the at least one processor configures to the at least one processor to function as:
a registering unit configured to register a template generated based on a partial image indicating an object in a first image among the provided images, and to register a histogram generated based on pixel values of the partial image indicating the object in the first image among the provided images;
a matching unit configured to estimate coordinates of a first object region by performing template matching in which the registered template is compared to a second image of the provided images, and to estimate coordinates of a second object region by performing histogram matching in which the registered histogram is compared to a histogram of a partial region of the second image; and
an object region determination unit configured to determine an estimated object region by employing the estimation results of the matching unit, wherein, in a case where a distance between coordinates of the second object region obtained by histogram matching and coordinates of the first object region obtained by template matching is within a predetermined range, the object region determination unit determines the first object region as the estimated object region by using the estimation result of the template matching, and wherein, in a case where the distance between coordinates of the second object region obtained by histogram matching and coordinates of the first object region obtained by template matching is not within the predetermined range, the object region determination unit determines the second object region as the estimated object region by using the estimation result of the histogram matching.

* * * * *